United States Patent
Coats

[15] 3,670,619
[45] June 20, 1972

[54] HORSESHOE FASTENER

[72] Inventor: William M. Coats, Route 3, Box 357, Huntsville, Ala. 35806

[22] Filed: Oct. 28, 1969

[21] Appl. No.: 871,850

Related U.S. Application Data

[63] Continuation-in-part of Ser. No. 749,820, Aug. 2, 1968, abandoned.

[52] U.S. Cl. ............................................. 85/9, 85/12, 85/32
[51] Int. Cl. ................................................... F16b 35/06
[58] Field of Search .................................... 85/12, 9, 28

[56] References Cited

UNITED STATES PATENTS

| | | | |
|---|---|---|---|
| 550,614 | 12/1895 | Hewitt | 85/50 |
| 843,907 | 2/1907 | O'Brien | 85/12 |
| 1,963,799 | 6/1934 | Nelson | 85/9 |
| 2,237,236 | 4/1941 | Matthews | 85/9 |
| 2,388,658 | 11/1945 | Pumphrey | 85/9 |
| 2,693,691 | 11/1954 | Pasanen | 85/9 |

*Primary Examiner*—Edward C. Allen
*Attorney*—Harrington A. Lackey

[57] ABSTRACT

A horseshoe fastener including a head member having an elongated straight shank supporting a planar head at a steep angle to the longitudinal axis of the shank for setting flush against the surface of a horse's hoof when the shank is extended through a hole through the shell of a hoof and a corresponding hole in a horseshoe, and a securing member for engaging the head member to secure the horseshoe to the hoof.

1 Claim, 8 Drawing Figures

PATENTED JUN 20 1972

3,670,619

INVENTOR:
WILLIAM M. COATS
BY
Harrington A. Lackey
ATTORNEY

HORSESHOE FASTENER

CROSS-REFERENCE TO RELATED APPLICATION

This application is a continuation-in-part of patent application Ser. No. 749,820, filed Aug. 2, 1968, and now abandoned for HORSESHOE FASTENER.

BACKGROUND OF THE INVENTION

This invention relates to a threaded fastener, and more particularly to a horseshoe fastener.

The conventional method of securing a horseshoe to a horse's hoof is to nail the shoe to the hoof. The nail is driven upward through the shell of the hoof until the tip of the nail penetrates the sloping hoof surface. The tip is then bent over to secure the nail in place. However, the weight of the shoe plus any force applied to the shoe, such as caused by striking an obstacle, such as a rock, is transmitted through the nail to the bent tip portion of the nail. Because of the limited dimensions of the tip of the nail, this force is concentrated upon a rather small area of the surface of the hoof. Consequently, where an excessive force or continual forces are applied to the hoof, or where the hoof is soft, or spongy, the bent tip of the nail soon penetrates the hoof, and eventually the shoe is lost.

The problems of maintaining a shoe with nails is aggravated by the inclusion of leather pads, lead weights, and other devices employed on the hoofs of show horses. In some instances, the hoof shells of show horses become so seriously damaged that it is very difficult to re-shoe the horse.

SUMMARY OF THE INVENTION

It is, therefore, an object of this invention to provide a horseshoe fastener which will overcome the disadvantages of the conventional horseshoe nail.

This invention incorporates essentially two elements: an elongated head member including an elongated straight shank supporting an angular head, and a securing member. The head must be supported on top of the shank of the head member at a steep acute angle in the order of 15–30 and have a plane or lower surface for engaging flush against the horse's hoof. Furthermore, the shank of the head member must be straight throughout its length, and the lower end portion of the shank is preferably threaded to cooperate with a threaded securing member.

This horseshoe fastener is adapted to be extended through a pre-formed hole in the shell of the hoof, and through a corresponding hole in the horseshoe, and when assembled, holds the horseshoe against the hoof. Furthermore, the fastener may be easily assembled and dis-assembled to remove, install or replace horseshoes at random.

Not only is the horseshoe fastener made in accordance with this invention more secure, but also the weight of the shoe as well as any forces exerted upon the shoe are distributed over a broader area of the surface of the hoof to minimize the possibility of tearing the hoof or exerting undue strain upon the hoof while secured to the shoe.

Furthermore, where the hoof of the horse is so soft or spongy that it will not support a nailed horseshoe, the horseshoe fastener made in accordance with this invention will hold the shoe on the hoof while it grows healthy at the rate of approximately one-half inch per month.

DESCRIPTION OF THE PREFERRED EMBODIMENT

Figure 1:
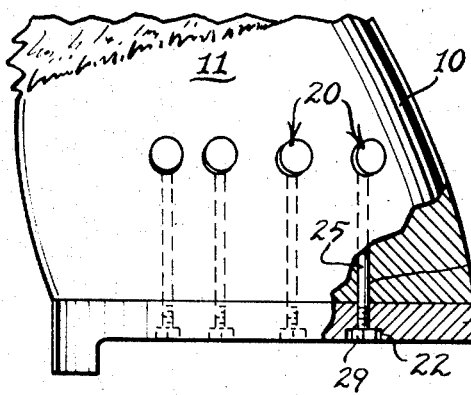
FIG. 1 is a fragmentary side elevation of a horse's hoof, to which a horseshoe is secured by several fasteners made in accordance with this invention, and with part of the hoof and shoe shown partly in section.
Figure 2:
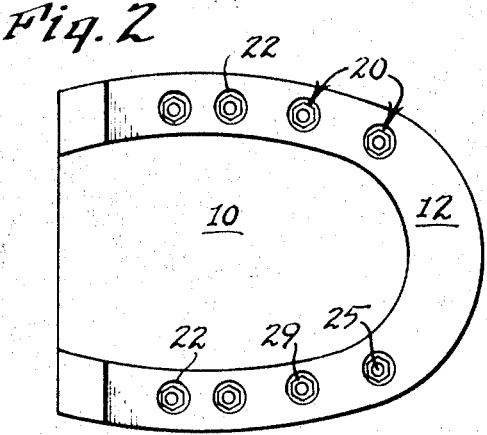
FIG. 2 is a bottom plane view of the horseshoe disclosed in FIG. 1.

Referring now to the drawings in more detail, FIG. 1 discloses a horse's hoof 10 including the outer shell 11, to which is attached a conventional horseshoe 12 by the fasteners 20 made in accordance with this invention.

Figure 4:
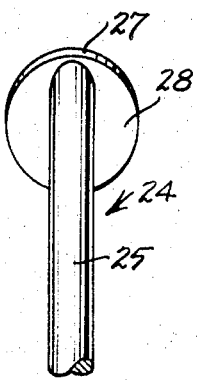
FIG. 4 is a fragmentary rear elevation of the head member disclosed in FIG. 3.
Figure 3:
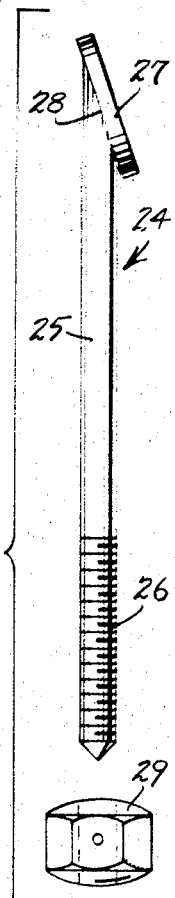
FIG. 3 is an exploded side elevation of one type of fastener made in accordance with this invention.
Figure 5:
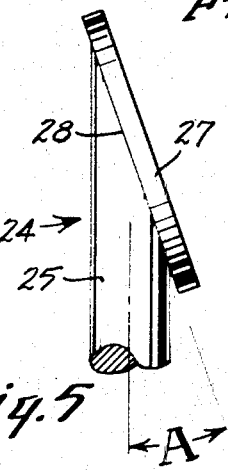
FIG. 5 is an enlarged fragmentary side elevation of the upper portion of the head member disclosed in FIG. 3.

The construction of the fasteners 20 is best disclosed in FIGS. 3, 4 and 5 of the drawings. The fastener 20 comprises a head member 24, including an elongated shank 25 which is straight throughout its length. The lower end portion 26 of the shank 25 is preferably externally threaded, as best disclosed in FIG. 3. Fixed to the top of the shank 25 is a head 27, preferably, but not necessarily, in the form of a disc, having a planar bottom surface 28 disposed at a steep acute angle A to the longitudinal axis of the straight shank 25, as best disclosed in FIG. 5.

The other element of the fastener 20 is an internally threaded nut 29 adapted to threadedly engage the threaded lower end portion 26.

Before the fasteners 20 can be used to secure a horseshoe 12 to the hoof 10, an elongated hole 21 must be drilled through the shell of the hoof 11 in such a manner that the bottom of the hole 21 will register with the corresponding hole 22 in the horseshoe 12. The hole 21 must be slightly shorter than the length of each shank 25, so that when the head 27 is flush against the surface of the shell 11, the bottom end of the shank 25 will not extend below the bottom of the horseshoe 12, and yet will extend far enough to be threadedly engaged by the nut 29.

The acute angle A, disclosed in FIG. 5, is critical for the horseshoe fastener 20. Because of the steepness of the slope of the outer surface of the shell 11 with respect to the bottom of the hoof 10, the bottom surface 28 of the head 27 must also be steep enough that it will rest substantially flush against the surface of the hoof shell 11 when the fastener 20 is in operative position in the hoof 10. If the bottom surface 28 is not substantially flush against the shell surface 11, then there will be an uneven load distribution exerted by the weight of the horseshoe 12 through the head member 24 and through only the portion of the head surface 28 engaging the hoof shell 11. Such concentrated pressure, which is sometimes intermittent, or abrupt, will unduly wear, or even tear, the shell of the hoof 11, causing the shoe 12 to become loose, or even to become disengaged. Consequently, the acute angle A between the bottom planar surface 28 of the head 27 and the longitudinal axis of the straight shank 25 is critical, and its range is in the order of 15°–30°. Furthermore, the acute angle A for any specific hoof 10 should be even more precise, corresponding as closely as possible to the angle of the slope of the shell surface 11 at the precise area engaged by the head 27 of the fastener 20 when completely assembled.

Figure 6:
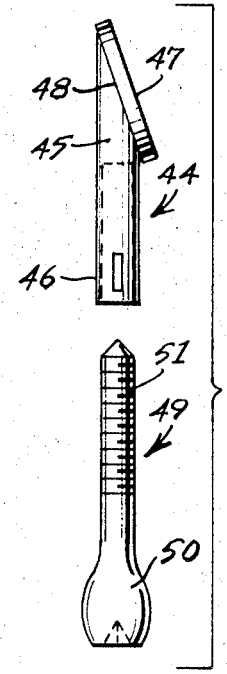
FIG. 6 is an exploded side elevation of a modified horseshoe fastener.

A modified form of fastener 40 is disclosed in FIG. 6, also including two elements, a head member 44 and a securing member 49. The head member 44 also has an elongated shank 45, straight throughout its length. The lower portion 46 of the head member 44 is tubular, and threaded internally, instead of externally. The head 47 is identical in shape, form and angle to the head 27 of the fastener 20 and is also provided with a planar lower surface 48 disposed at an acute angle, of the same critical range as the acute angle A in FIG. 5 with respect to the longitudinal axis of the shank 45.

The securing member 49 is a bolt instead of a nut, having an enlarged head 50 and an externally threaded portion 51 for engaging the internally threaded tubular lower end portion 46. The fastener 40 is assembled and used in substantially the same manner as the fastener 20 to secure a horseshoe, such as 12 to the hoof 10.

Figure 7:
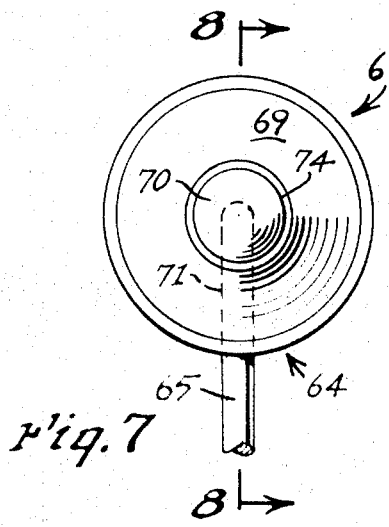
FIG. 7 is a fragmentary front elevation of another modification of a head member.
Figure 8:
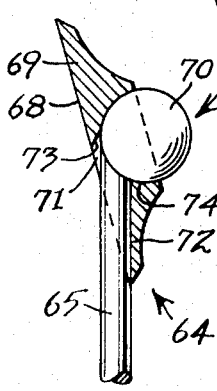
FIG. 8 is a section taken along the line 8—8 of FIG. 7.

Another modified form of head member 64 is disclosed in FIGS. 7 and 8. This head member 64 also includes an elongated straight shank 65. However, the head 67 constitutes essentially two relatively movable head elements 69 and 70. The element 69 is in the shape of a disc or button having a planar bottom surface 68. Extending through the button element 69 is a hole 71 for receiving the shank 65 at a steep acute angle A to the bottom surface 68. The width of the hole 71 is only slightly greater than the diameter of the shank 65, to receive the shank 65. The front wall 72 and the rear wall 73 of the hole 71 diverge downward at approximately an angle equal to the angular range variation of the angle A. Since the angle A should vary between 15°—30°, the range variation is 15°. The angle that the shank 65 forms with the bottom surface 68 when the shank 65 fits against the front wall 72 is the steepest angle, or 15°. When the shank 65 fits against the rear wall 73, it forms the least steep angle (30°) with the bottom surface 68.

The upper portion of the hole 71 is intercepted by a spherical recess 74, in substantially the upper center portion of the button element 69, for receiving the substantially spherical head element 70 fixed to the top of the shank 65. The bottom of the hole 71 opens eccentrically through the bottom surface 68 of the button element 69.

The lower portion of shank 65 may take the form of, and be secured in the manner of, either the shank 25 of head member 24 or shank 45 of head member 44.

The head member 64 may be assembled in somewhat the same manner as head members 24 and 44. After the hole 21 is formed through the hoof 10, the head or button element 69 is placed on the hoof surface in registry with the hole 21, with the front wall 72 down, and the shank 65 inserted through aligned holes 72, 21 and 22 until the head element 70 seats in recess 74. The bottom portion of shank 65 is then appropriately secured to shoe 12.

As the head member 64 is tightened in place, the pressure exerted by the head element 70 against the button element 69 causes the bottom surface to adjust to fit flush against the hoof surface. Essentially the head elements 69 and 70 comprise a universal fitting. It will be understood that the entire surface of the head element 70 need not be spherical, so long as that portion seated in recess 74 is spherical.

I claim:
1. A horseshoe fastener comprising:
   a. a head member having an elongated shank, straight throughout its length, and having an upper head and a lower end portion,
   b. said head comprising a relatively thin, circular member having substantially parallel upper and lower planar surfaces projecting transversely outward from the periphery of said shank,
   c. the upper portion of said shank being integrally joined to said lower planar surface so that said head is disposed at a steep acute angle having a range of approximately 15° – 30° to the longitudinal axis of said shank,
   d. the longest dimension of the juncture of said shank with said lower planar surface exceeding the radius of said head,
   e. the transverse dimension of said lower planar surface being at least twice as great as the transverse dimension of said shank, but substantially less than the length of said shank, and
   f. thread means for securing said lower end portion of said shank to hold a horseshoe against the bottom of a horse's hoof, while said shank extends through a hole in the shell of said hoof and said head fits substantially flush against said shell.

* * * * *